United States Patent
Cole et al.

[11] 3,877,760
[45] Apr. 15, 1975

[54] ANTI-LOCK VEHICLE BRAKE SYSTEMS

[75] Inventors: Michael George Cole; Derek Robert Skoyles; Denis Sharp, all of Salfords near Redhill, England

[73] Assignee: U.S. Philips Corporation, New York, N.Y.

[22] Filed: Mar. 8, 1974

[21] Appl. No.: 449,357

Related U.S. Application Data
[63] Continuation of Ser. No. 263,421, June 16, 1972.

[30] Foreign Application Priority Data
July 12, 1971 United Kingdom............... 32541/71

[52] U.S. Cl............. 303/21 F; 251/129; 303/21 CE
[51] Int. Cl............................................... B60t 8/06
[58] Field of Search................ 137/509; 188/181 A; 251/129, 139; 303/21 F, 21 FS, 21 SV, 21 CE, 21 CF, 21 CG, 61

[56] References Cited
UNITED STATES PATENTS

| | | | |
|---|---|---|---|
| 2,328,805 | 9/1943 | Holthouse | 251/129 X |
| 3,617,098 | 11/1971 | Leiber | 303/21 FS |
| 3,665,962 | 5/1972 | Dornseiffen | 251/129 X |
| 3,719,401 | 3/1973 | Peruglia | 303/21 FS |

Primary Examiner—Duane A. Reger
Attorney, Agent, or Firm—Frank R. Trifari

[57] ABSTRACT

An anti-lock solenoid valve mechanism which includes a fluid pressure differential member for controlling the flow rate of fluid through the mechanism when the latter is energised. This member is displaced against the armature by the pressure differential across it due to fluid flow past it and displaces the armature against the solenoid magnetic force towards its closed position to reduce fluid flow until a state of equilibrium exists in which the armature is held by the resultant forces in a position in which it has to undergo only minimal displacement to close the solenoid valve on de-energisation.

9 Claims, 3 Drawing Figures

ANTI-LOCK VEHICLE BRAKE SYSTEMS

This is a continuation, of application Ser. No. 263,421, filed June 16, 1972.

This invention relates to anti-lock brake systems for wheeled vehicles, that is, brake systems including means for improving braking performance of a vehicle by relieving braking pressure applied to a road wheel of the vehicle if the wheel tends to lock on a slippery surface following brake application and then increasing the braking pressure again without the need for any change in the actual braking action (by a person using the brake) causing the brake application. Such brake systems can be successful in reducing the risk of skidding due to wheel lock and in maintaining directional control during braking and can also reduce braking distances.

The invention relates more particularly to anti-lock vehicle brake systems of the character comprising, for use in conjunction with a vehicle wheel and associated wheel brake, a fluid pressure source which in response to a braking action provides fluid under pressure via a fluid pressure connection to the brake, said fluid under pressure being effective to cause the brake to produce braking pressure at said wheel solenoid valve mechanism, a control circuit responsive to an electrical input from a wheel movement sensor to produce an electrical output to energize said solenoid valve mechanism when a particular criterion related to wheel rotational movement obtains, and a relief connection interconnected with said fluid pressure connection or with the brake and adapted to be opened by said solenoid valve mechanism, when the latter is energised, to allow displacement of fluid from said first pressure connection or from the brake into said relief connection to cause a reduction in the pressure of such fluid and thereby relieve braking pressure. A usual criterion - though not the only one - is when wheel deceleration is in excess of a predetermined value.

An anti-lock vehicle brake system of the above character may be either of the master cylinder type in which fluid in a master cylinder is pressurized by a piston when a braking action takes place to pressurize fluid in said fluid pressure connection, or of the continuously pumped type in which fluid under pressure is available continuously in the brake system and is "modulated" by a braking action such that the pressurized fluid is applied through said fluid pressure connection to the brake to an extent determined by the extent of modulation. Also, the braking action causing movement of the master cylinder piston or of the brake modulator, as the case may be, may be with or without servo or amplifier assistance. Having regard to the above the term "fluid pressure source" as used in this specification is to be construed accordingly.

In an anti-lock vehicle brake system of the above character the solenoid valve mechanism remains energized to cause braking pressure to be relieved for what will be termed an "anti-lock" period and is de-energized at the end of this period to allow braking pressure to increase again. This operation to cause braking pressure to be relieved and then to allow it to increase again is repeated in successive anti-lock periods each time the wheel tends towards a locked condition that could result in skidding during braking action.

The initial volume of fluid displaced through said relief connection each time the solenoid valve mechanism is energized has to be sufficient to relieve braking pressure. If the solenoid valve mechanism is of a type simply having an orifice which is opened by the mechanism when the latter is energized, then during the time that the solenoid valve mechanism is held energized, braking pressure will continue to decrease due to fluid pressure at the brake decaying at an exponential rate which is a function of the size of the orifice and of the progressively decreasing fluid pressure at the brake. For a given value of fluid pressure at the brake, a relatively high exponential rate of decay can be chosen so that for a given duration of anti-lock period, braking pressure is reduced just sufficiently to allow a wheel which is braked on a slippery surface to recover. However, where such a choice is made, particularly in the case of a high pressure braking system (e.g., where wheel locking pressure on a good surface is around 1,700 p.s.i.), the minimum practical duration of the anti-lock period may be so great as to result in fluid pressure at the brake decaying to a far lower value than that needed to allow a wheel which is braked on a good surface to recover. As a result, vehicle stopping distances on a good surface would be less than optimum due to the time taken in each anti-lock operation for the fluid pressure to build-up again to almost locking value. Conversely, it will be apparent that if a slower exponential rate of decay of fluid pressure at the brake is chosen so as to provide optimum performance on a good surface, then the time taken to reduce braking pressure sufficiently to prevent locking on a slippery surface may be so great as to render a system unworkable on slippery surfaces. Hitherto, therefore, a compromise has had to be made in regard to the choice of the rate of decay of fluid pressure at the brake consequent upon energization of the solenoid valve mechanism.

Such a compromise would be acceptable if each anti-lock period could be arranged to occur during the most nearly linear slope portion of the pressure/time curve for exponential rate of decay fluid pressure at the brake, because a rate could then be selected whose most nearly linear slope portion suited both good and slippery surfaces. However, this is not possible because fluid pressure at the brake has to be reduced as soon as possible following detection of imminent locking of a braked wheel, in order to prevent wheel lock, so that it is over at least the initial non-linear slope portion of the exponential pressure/time curve that each anti-lock period has to occur.

Having regard to the foregoing, it will be appreciated that anti-lock operation would be improved if fluid pressure at the brake decayed substantially linearly, and not exponentially, substantially from the commencement of each anti-lock period and it is an object of the present invention to provide a solenoid valve mechanism for achieving this.

According to the present invention such a solenoid valve mechanism includes in a fluid flow path through the mechanism means responsive to flow of fluid therein for so controlling the flow rate of such fluid as to maintain it substantially constant.

In carrying out the invention the solenoid valve mechanism can include an armature which is displaceable by a solenoid force produced on energization of the mechanism to cause a valve to open an orifice in said fluid flow path with said means comprising a flow measuring member which is displaceable by a force produced by a fluid pressure differential across it due to said flow of fluid to displace said armature against said solenoid force so as to tend to cause said valve to close said orifice, the fluid flow rate being thereby held at a substantially constant value at which said force produced by said fluid pressure differential is substantially equal to said solenoid force.

Suitably, a spring is provided to maintain said armature in a position in which said valve closes said orifice when the mechanism is unenergized, the mechanism being so designed that a magnetic force which will be produced on energization thereof is sufficient to overcome the force exerted on the armature by said spring and the fluid pressure differential at said orifice to displace the armature to cause said valve to open said orifice, said solenoid force being essentially the resultant force which effects such armature displacement.

Preferably, when the mechanism is unenergized said flow measuring member is held out of engagement with said armature and is adapted to undergo initial displacement by fluid flow through the mechanism into such engagement at the onset of such flow when the mechanism is energized to open said orifice, whereby to permit an initially high flow rate until said engagement occurs. For this purpose the mechanism can include a second spring which acts on the flow measuring member in a sense urging it away from engagement with said armature, the force exerted by this second spring being sufficiently small in relation to said solenoid force and the fluid pressure differential force for it to have negligible affect on the operation of the mechanism when the latter is energized.

Conveniently, the flow measuring member has a bore extending through it which affords a restricted fluid flow path from one side of the member to the other, the size of this bore and said solenoid force determining the flow rate of fluid through the mechanism.

In further considering the nature of the invention, reference will now be made by way of example to the accompanying drawing of which:

Figure 1:
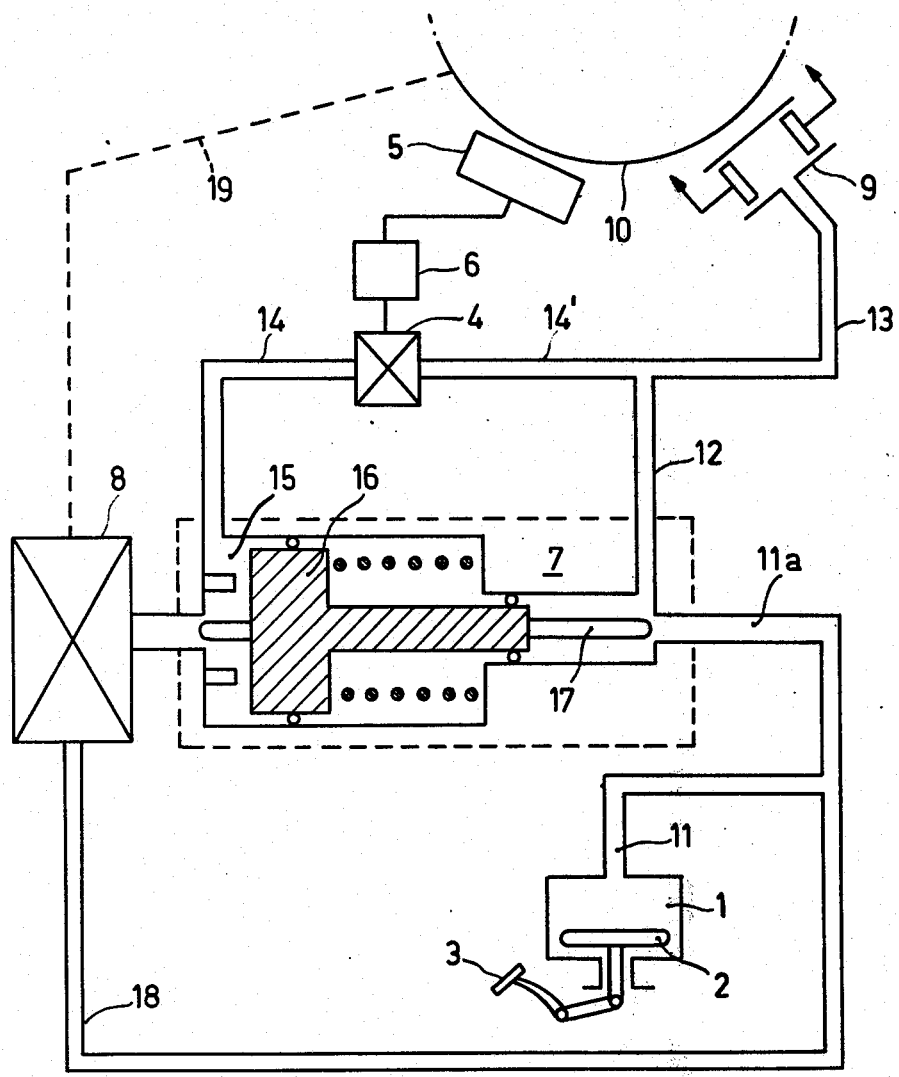
FIG. 1 shows diagrammatically one form of anti-lock vehicle brake system of the character referred in which a solenoid valve mechanism according to the invention can be incorporated.

Referring to the drawing, the anti-lock vehicle brake system there shown is of a particular form which is described in greater detail than herein in co-pending application Ser. No. 215,622. This system is a master cylinder type hydraulic system comprising a master cylinder 1 having a piston 2 which is actuable by a brake pedal 3. The system further comprises a solenoid valve mechanism 4, a wheel movement sensor 5, a control circuit 6, a variable restrictor arrangement 7 and a scavenging pump 8. A vehicle brake 9 for a wheel 10 is controlled by the system.

In operation of the system of FIG. 1 for normal brake application, fluid in pressure lines 11, 11a, 12 and 13 is pressurized by the master cylinder 1 to an extent determined by a driver's braking action and this produces a corresponding braking pressure in the brake 9. If the driver's braking action is likely to cause skidding due to the wheel locking, this is detected by the wheel sensor movement sensor 5 and the control circuit 6, and solenoid valve mechanism 4 is energized by the control circuit 6. Details of the manner of the operation and the composition of the wheel movement sensor 5 and the control circuit 6 are not thought to be necessary for an understanding of the present invention, but an example is given in the aforementioned co-pending patent application Ser. No. 215,622 in conjunction with co-pending application Ser. No. 884,551.

As a result of the energization of the solenoid valve mechanism 4, a fluid path is opened by the latter between a relief connection 14 and pressure lines 12 and 13 (via line 14') so that some of the fluid under pressure in the pressure lines 12 and 13 is displaced from the brake 9 into the relief connection 14, and braking pressure is relieved. This fluid passes via the relief connection 14 to a reservoir 15 of the variable restrictor arrangement 7, where it is applied behind a spring-loaded piston 16 and displaces this piston 16 to the right (as shown in the drawing) so that a restrictor element 17 on the piston 16 enters the pressure line 11a, thereby restricting flow of fluid through this line to the pressure line 12. Braking pressure is now reduced to an extent determined by the extent of displacement of the piston 16 to the right and thus to the volume of displaced fluid. For normal anti-lock operation, the solenoid valve mechanism 4 is held energised by the control circuit 6 for only a short time sufficient to allow the braking pressure to fall sufficiently low for the wheel to recover. Once the solenoid valve mechanism 4 is de-energised to close the fluid path between the relief connection 14 and the pressure lines 12 and 13, the pump 8, which is returning fluid from the reservoir 15 of the variable restrictor arrangement 7 to the pressure line 11a via a pressure line 18, quickly removes sufficient fluid from the reservoir 15 for the piston 16 to return under its spring loading towards its normal position so that the restrictor element 17 is withdrawn from the pressure line 11a to allow the rate of braking pressure build-up to increase. As indicated by the broken line 19 the pump 8 can be driven by the wheel 10.

From the foregoing description it will be appreciated that during the time that the solenoid valve mechanism 4 is held energized, so that fluid is being displaced therethrough to the relief connection 14, the fluid pressure at the brake 19 is decaying to cause the braking pressure to be relieved. In order to achieve a substantially linear rate of decay of this fluid pressure substantially from the instant that the solenoid valve mechanism 4 is energised, this mechanism is of the form shown in FIG. 2 to which reference will now be made.

Figure 2:
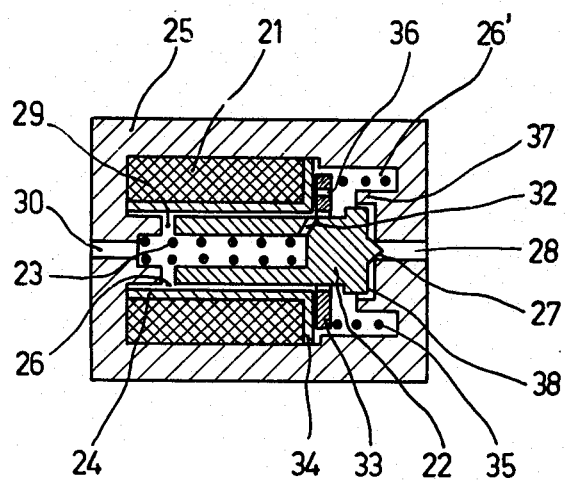
FIG. 2 shows diagrammatically a solenoid valve mechanism according to the invention.

Referring to FIG. 2, the solenoid valve mechanism there shown comprises an energizing coil 21 which is adapted for energisation by a suitable electrical output from the control circuit (6-FIG. 1) and is effective on energization to produce a magnetic force which displaces an armature 22 of the mechanism to the left (as seen in the drawing) against the force exerted on the armature 22 by a spring 23 which acts to urge the armature 2 to the right.

The energizing coil 21 is of hollow cylindrical shape and is mounted on a flanged former 24 inside a generally hollow cylindrical magnetic structure 25. The armature 22, which is also cylindrical, is located in the hollow interior 26 of the coil 21 and magnetic structure 25 and is displaceable axially therein between a first limit position, as shown, in which a valve seal 27 carried on the armature A effects a fluid seal between the hollow interior H and the inner end of a smaller diameter bore or orifice 28, and a second limit position in which the end of the armature 22 remote from the valve seal 27 engages with a stop 29 which is formed on the magnetic structure 25. The hollow interior 26, the bore 28 and a second smaller diameter bore 30 form a fluid path through the solenoid valve mechanism. The armature 22 is hollow for a major portion of its length and the spring 23 is located in this hollowed portion. The inner (closed) end of the hollowed portion of the armature 22 communicates by way of a small diameter bore 32 formed in the armature 22 with an enlarged region 26' of the hollow interior 26. There is slidingly located in the enlarged region 26' an annular slide member 33 through which the solid portion of the armature 22 extends freely and which is urged towards the flange 34 of the flanged former 24 by a spring 35. A small diameter bore or orifice 36 provides a fluid path between opposite sides of the slide member 33, but fluid leakage can also occur around the slide member 33. The magnetic structure 25 is formed with an annular shoulder 37 which extends into the enlarged region 26' and which forms a recess into which a flange 38 on the armature 22 enters when the armature 22 is in said first limit position.

In use of the solenoid valve mechanism of FIG. 2 in the system of FIG. 1, the bore 28 would be connected to the pressure line 14 and the bore 30 would be connected to the pressure line 14' as indicated: the operation of the mechanism is as follows.

When the coil 2 is energized, the armature 22 is urged to the right by the spring 23 and a force due to the fluid pressure differential at the base 28. This is a first limit position wherein the valve seal 27 seals the bore 28. Therefore, although fluid from the brake 9 can enter the mechanism via bore 30, it cannot pass through the mechanism to the reservoir 15 at this time. Fluid entering the mechanism from the brake passes to the enlarged region 26' via the bore 32 and due to leakage around the sides of the armature 22. Whatever the pressure of this fluid (i.e. whether braking occurs or not), the fluid pressure is equalized at opposite sides of the slide member 33, so that the resultant force exerted on this member by the spring 35 urges it to the left towards the flange 34 of the former 24, as indicated.

Figure 3:
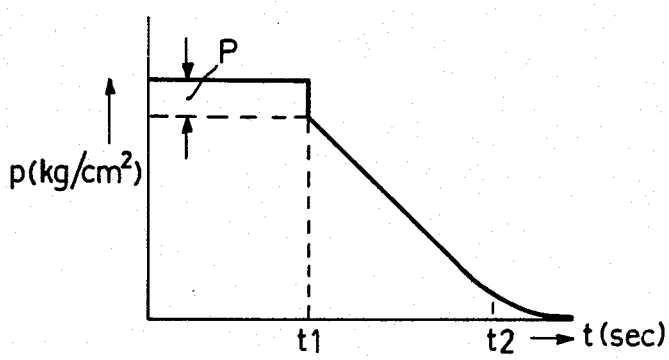
FIG. 3 shows a pressure/time curve which is illustrative of the action of the solenoid valve mechanism of FIG. 2.

If the coil 21 is now energized at time t1 (FIG. 3) the magnetic force exerted on the armature 22 overcomes the forces exerted by the spring 23 and the fluid pressure differential at the bore 28 and displaces the armature towards its second limit position. This causes the valve seal 27 to unblock the bore 28, thereby allowing fluid to escape from the brake 9 via the solenoid valve mechanism to the reservoir 15. This escape of fluid causes the slide member 33 to be displaced by the fluid flow against the action of the spring 35 until the slide member reaches the flange 38 on the armature 22. As indicated in FIG. 3 by the initial substantially vertical portion P of the pressure/time curve, a rapid initial reduction of fluid pressure at the brake occurs until this condition is reached. Further fluid flow to the reservoir is mainly via the bore 36 through the slide member 33, but there is also leakage of fluid around the slide member 33. As a result, a fluid pressure differential is produced across the slide member 33 which produces on it a force acting against the "solenoid" force (i.e., the resultant force which is holding the armature 22 to the left with the coil 21 energized). The solenoid valve mechanism is so designed that the force due to the fluid pressure differential is sufficiently greater than the solenoid force at this time to displace the slide member 33, and with it the armature 22 since the flange 38 is being engaged by the slide member 33, to the right, with the result that the valve seal 27 tends to block the bore 28. This reduces fluid flow through the solenoid valve mechanism so that the fluid pressure differential across the slide member 33 is reduced to allow the solenoid force to become effective again to tend to unblock the bore 28 by displacing the armature 22 to the left, and so on. The result is a state of equilibrium which produces a stabilised steady flow of fluid through the solenoid valve mechanism at a rate which is determined essentially by the size of the bore 36 and the solenoid magnetic force minus the force of the spring 23. The force exerted by the spring 35 is sufficiently small to be ignored. Thus, a substantially linear rate of decay of fluid pressure at the brake is achieved substantially from time t1 that the solenoid valve mechanism is energised, with the slide member 33 functioning, in effect, as a flow measuring member to provide a continuous correction of the flow rate.

Since the valve seal 27 is maintained very close to the bore 28 during the linearly controlled fluid pressure drop, the armature 22 has to move only a very short distance, once the solenoid valve mechanism is de-energized at, say, time t2 (FIG. 3), in order for the valve seal 27 to block the bore 28. Therefore, the fluid pressure drop cannot undershoot to any significant extent the value to which it has fallen at time t2, as would occur with a solenoid valve mechanism in which the armature has to return from a limit position in which it had been held by the solenoid force before fluid flow can be interrupted.

What we claim is:

1. An anti-lock vehicle brake system comprising a brake fluid pressure source, a brake fluid pressure line for operating a brake of the brake system, a relief connection, a solenoid valve mechanism connected between the brake fluid pressure line and the relief connection for operation under the control of a control circuit and wheel movement sensing means for producing a substantially linear decay of fluid pressure at the brake substantially from the commencement of each anti-lock period, said solenoid valve mechanism comprising:

A. a hollow magnetic structure having a fluid entry bore and a fluid exit bore connected to the brake fluid pressure line and the relief connection respectively;

B. an armature positioned in said hollow magnetic structure in the path of fluid flow from said entry bore to said exit bore;

C. a valve seal at the end of said armature for sealing said exit bore;

D. spring means within said hollow magnetic structure for urging said armature and therefore said valve seal against said exit bore in an exit bore sealing position;

E. energizing coil means mounted within said hollow magnetic structure and, when energized, moving said armature and therefore said valve seal into an exit bore open position by overcoming the sealing effect of said spring means, the opening of said exit bore permitting fluid in the brake fluid line to flow through said hollow magnetic structure from said entry bore to said exit bore to reduce the fluid pressure at the brake and;

F. a fluid flow control member positioned in the fluid flow path within said hollow magnetic structure for urging said armature toward its exit bore sealing position in response to fluid flow through said structure, such that said armature is moved toward said exit bore sealing position when fluid flow through said structure exceeds a predetermined rate.

2. The system of claim 1 wherein said fluid control member maintains a substantially constant fluid flow rate through said hollow magnetic structure and, thereby, produces a substantially linear decay of fluid pressure at the brake substantially from the commencement of each anti-lock period.

3. The system of claim 2 wherein the fluid force on said fluid flow control member is substantially equal to the force produced by said energized coil means.

4. A system of claim 1 wherein when said energizing coil means is energized, said fluid flow control member is held out of engagement with said armature and is adapted to undergo initial displacement by fluid flow into such engagement at the onset of fluid flow, whereby to permit an initially high flow rate.

5. The system of claim 1 further including a second spring means within said hollow magnetic structure and positioned between said valve seal and said fluid flow control member for urging said fluid flow control member away from engagement with said armature.

6. The system of claim 5 wherein the force exerted by said second spring means is sufficiently small in relation to the force produced by said energized energizing coil means and the fluid pressure force acting on said fluid flow control member to have negligible effect on the movement of said fluid flow control member after said energizing coil means is energized.

7. The system of claim 6 wherein said fluid flow control member is an annular slide member encircling said armature and said armature has a flange which said fluid flow control member engages to urge said armature toward its exit bore sealing position.

8. The system of claim 7 wherein said fluid flow control member has a bore extending through it which affords a restricted fluid flow path from one side of the member to the other, the size of said bore and the force produced by the energized energizing coil means determining the flow rate of fluid through said hollow magnetic structure.

9. A solenoid valve mechanism comprising:
a cylindrical magnetic structure having a small diameter entry bore at one end and a small diameter exit bore at the other end, hollow interior, an enlarged region within said interior adjacent said exit bore, said bores and interior forming a fluid flow path through said structure;
a hollow cylindrical energizing coil mounted inside said structure;
a cylindrical armature located in the hollow interior of said coil and magnetic structure, having a valve seal at one end, axially displaceable within said coil from a limit position in which said valve seal effects a fluid seal between said hollow interior and the exit bore, said armature having a passage to permit fluid flow from said entry bore to said enlarged region, and a flange at its valve seal end;
an annular slide member slidingly located in said enlarged region between said passage and said exit bore the valve seal end of the armature passing through the center of said slide member, said slide member having a second passage providing a fluid path between opposite sides thereof;
first means for urging said armature into said limit position; and
second means for urging said slide member away from the exit bore end of said structure,
whereby energization of said coil will displace said armature from said limit position, and fluid flow will displace said slide member into contact with said flange, thereby urging said armature toward said limit position.

* * * * *

UNITED STATES PATENT AND TRADEMARK OFFICE
CERTIFICATE OF CORRECTION

PATENT NO. : 3,877,760
DATED : April 15, 1975
INVENTOR(S) : MICHAEL GEORGE COLE ET AL It is certified that error appears in the above-identified patent and that said Letters Patent are hereby corrected as shown below:

Column 1, line 25, after "wheel" insert --, a--;

line 34, change "first" to --fluid--;

line 35, after "connection" insert --whereby--;

Column 3, line 21, before "flow" insert --fluid--;

Column 4, line 67, after "armature" change "A" to --22--;

Column 5, line 1, after "interior" change "H" to --26--;

line 20, before "slide" insert --sides of--.

Signed and Sealed this thirtieth Day of March 1976

[SEAL]

Attest:

RUTH C. MASON
*Attesting Officer*

C. MARSHALL DANN
*Commissioner of Patents and Trademarks*